United States Patent [19]
Hodges

[11] Patent Number: 5,471,693
[45] Date of Patent: Dec. 5, 1995

[54] SUPPORT AND ATTACHMENT MECHANISM FOR A DOCKLEVELER LIFT BAG

[75] Inventor: Charles H. Hodges, Ruxton, Md.

[73] Assignee: Kelley Company Inc., Milwaukee, Wis.

[21] Appl. No.: 131,983

[22] Filed: Oct. 4, 1993

[51] Int. Cl.⁶ .................................................. E01D 1/00
[52] U.S. Cl. ...................................... 14/71.3; 254/93 HP
[58] Field of Search ...................... 14/69.5, 71.1, 14/71.3, 71.7; 254/88, 93 HP

[56] References Cited

U.S. PATENT DOCUMENTS

| | | |
|---|---|---|
| 2,495,092 | 1/1950 | Cox et al. . |
| 2,804,118 | 8/1957 | Bayerkohler . |
| 3,211,425 | 10/1965 | Greulich et al. . |
| 3,521,861 | 7/1970 | Freudenthal et al. . |
| 3,528,118 | 9/1970 | Smith . |
| 3,659,899 | 5/1972 | Phillips et al. ........................ 298/22 R |
| 3,711,157 | 1/1973 | Smock .................................. 298/8 R |
| 4,081,874 | 4/1978 | Artzberger ............................. 14/71.7 |
| 4,293,969 | 10/1981 | Frommelt ............................. 14/71.1 |
| 4,572,579 | 2/1986 | Saito ..................................... 298/1 A |
| 4,688,760 | 8/1987 | Garman et al. ..................... 254/93 HP |
| 4,955,923 | 9/1990 | Hageman ............................. 14/71.7 |
| 5,042,103 | 8/1991 | Megens ................................ 14/71.7 |

FOREIGN PATENT DOCUMENTS

| | | |
|---|---|---|
| 2354388 | 10/1973 | Germany . |
| 3743551 | 7/1989 | Germany .......................... 254/93 HP |
| 161243 | 7/1964 | U.S.S.R. . |
| 835142 | 5/1960 | United Kingdom . |

Primary Examiner—Ramon S. Britts
Assistant Examiner—James A. Lisehora
Attorney, Agent, or Firm—Michael, Best & Friedrich

[57] ABSTRACT

An improved support and attachment mechanism for a dockleveler lift bag. The dock leveler includes a supporting structure or frame which is mounted in a pit in a loading dock and the pit has a forwardly sloping floor. The rear end of the ramp is pivoted to the supporting structure, so that the ramp can be pivoted between a horizontal position and an upwardly inclined position. A bag support member is located in the pit beneath the ramp and is pivoted to the rear end of the ramp. An inflatable bag assembly is located adjacent the rear end of the ramp and is positioned between the underside of the ramp and the bag support member. By inflating the bag assembly, the ramp can be pivoted from the horizontal position to the upwardly inclined position. Guide members, such as rollers, are mounted on the forward end of the bag support member and ride on the floor of the pit as the bag assembly is inflated and the ramp is pivoted upwardly.

20 Claims, 2 Drawing Sheets

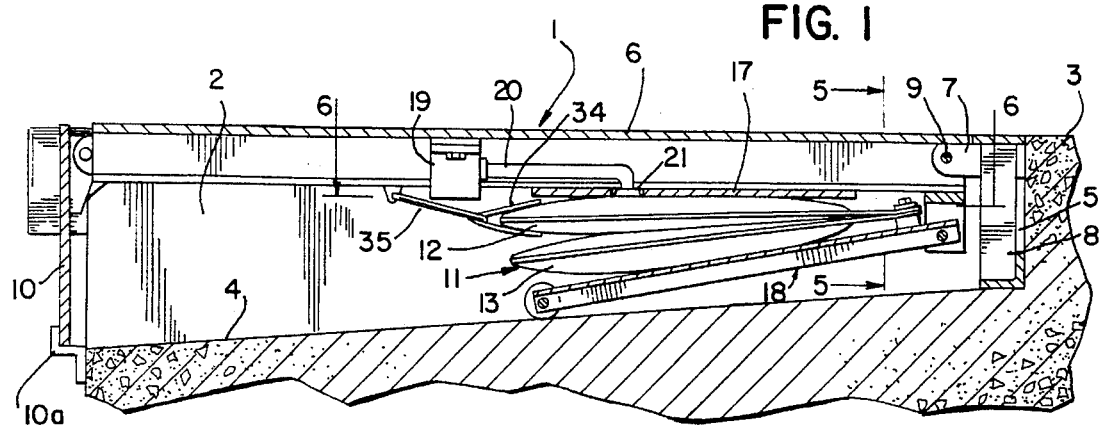
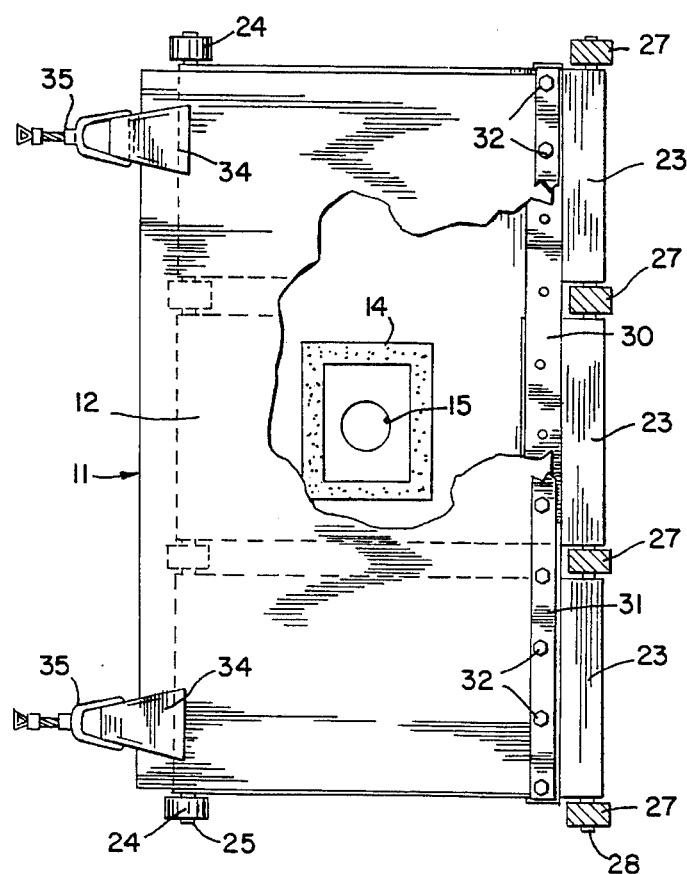
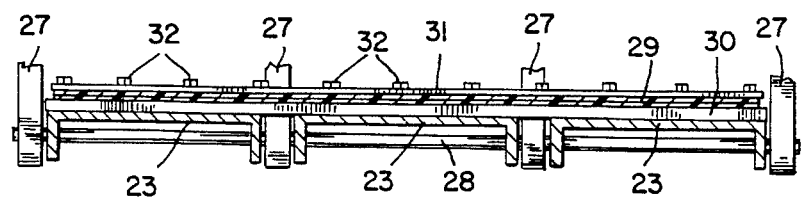

SUPPORT AND ATTACHMENT MECHANISM FOR A DOCKLEVELER LIFT BAG

BACKGROUND OF THE INVENTION

Dock levelers or dock boards are mounted on loading docks and are adapted to bridge the gap between the dock and the bed of a truck or carrier parked in front of the dock to enable material handling equipment, such as a forklift truck to move between the dock and the truck bed.

The typical dock leveler includes a frame or supporting structure which is mounted in a pit or depression in the loading dock and the rear end of a ramp or deck plate is pivoted to the supporting structure so that the ramp is movable between a horizontal cross traffic position and an upwardly inclined position.

Hinged to the forward end of the ramp is an extension lip which is movable between a downwardly hanging pendant position and an extended position where the lip forms an extension to the ramp.

After a truck has parked in front of the loading dock in preparation for a loading operation, the ramp of the conventional dock leveler is pivoted upwardly and as the ramp approaches its upwardly inclined position, the lip is pivoted outwardly to the extended position. As the ramp is subsequently lowered, the extended lip will engage the bed of the truck. After the loading operation has been completed, the lip will fall by gravity to the pendent position as the truck pulls away from the loading dock.

Traditionally, the ramp of the dock leveler has been operated either by a mechanical or hydraulic mechanism. With a typical mechanical operation, an extension spring is mounted in the pit beneath the ramp and is connected through a lever arm to the rear edge of the ramp. When a ramp holddown mechanism is released, the force of the spring will pivot the ramp to the upwardly inclined position.

With a hydraulically-operated dock leveler, a hydraulic cylinder unit is connected between the supporting frame and the ramp and through extension of the cylinder unit, the ramp will be pivoted to the upwardly inclined position.

U.S. patent application Ser. No. 07/814,002, filed Dec. 26, 1991, now abandoned, describes an inflatable bag mechanism that is utilized to pivot the ramp to the upwardly inclined position. As described in that patent application, a pleated bag is interposed between the bottom of the pit in the loading dock and the undersurface of the ramp. By inflating the bag with low pressure air, the ramp will be pivoted to the upwardly inclined position.

SUMMARY OF THE INVENTION

The invention is directed to an improved support and attachment mechanism for a dockleveler lift bag. In accordance with the invention, an inflatable bag assembly, preferably formed of a series of superimposed interconnected bags, is positioned between the undersurface of the ramp and a bag supporting member that is located in the pit in the loading dock.

The bag supporting member is pivotally connected to the rear end of the ramp, while the forward end of the bag support member carries a plurality of rollers which are disposed to ride on the forwardly sloping floor of the pit.

Each bag in the bag assembly is provided with a rearwardly extending strip or tether and the tethers are secured to the rear portion of the bag support member.

As the bag assembly is inflated through operation of a low pressure fan, the ramp will be pivoted upwardly. Because the bag support member is pivoted to the rear end of the ramp, the ramp and bag support member will move together and the rollers on the forward end of the bag support member permit the bag support member to move forwardly relative to the pit floor, as the ramp is elevated.

The construction of the invention prevents the bag from snapping or popping forwardly as the ramp is elevated and thereby eliminates undue strain on the bag tethers.

As relative movement between the bag assembly and the ramp plate, as well as the bag supporting member, is virtually eliminated, wear on the bag surfaces which are in contact with the ramp and the bag supporting member is minimized.

As a further feature of the invention, the upper end of the bag assembly is removably connected to a ramp plate, which is mounted to the underside of the ramp. With this connection, when the lip of the dock leveler is extended and is in engagement with the truck bed and pressure is released in the bag assembly, the bag assembly will retain its volume and will not collapse downwardly against the bag support member. When the truck subsequently pulls away from the loading dock, the ramp will descend, compressing the air within the full volume bag assembly and exhausting the air through a restriction in the fan, so that the ramp will descend slowly thus preventing a rapid and uncontrolled descent of the ramp, which could occur if the bag assembly is collapsed against the bag support member when the truck pulls away from the loading dock.

Other objects and advantages will appear in the course of the following description.

DESCRIPTION OF THE DRAWINGS

The drawings illustrate the best mode presently contemplated of carrying out the invention.

In the drawings:

FIG. 1 is a vertical section of a dock leveler incorporating the invention with the ramp being shown in the horizontal position;

FIG. 5 is a section taken along line 5—5 of FIG. 1; and

FIG. 6 is a top plan view of the bag assembly with parts-broken away.

DESCRIPTION OF THE ILLUSTRATED EMBODIMENT

Figure 2:
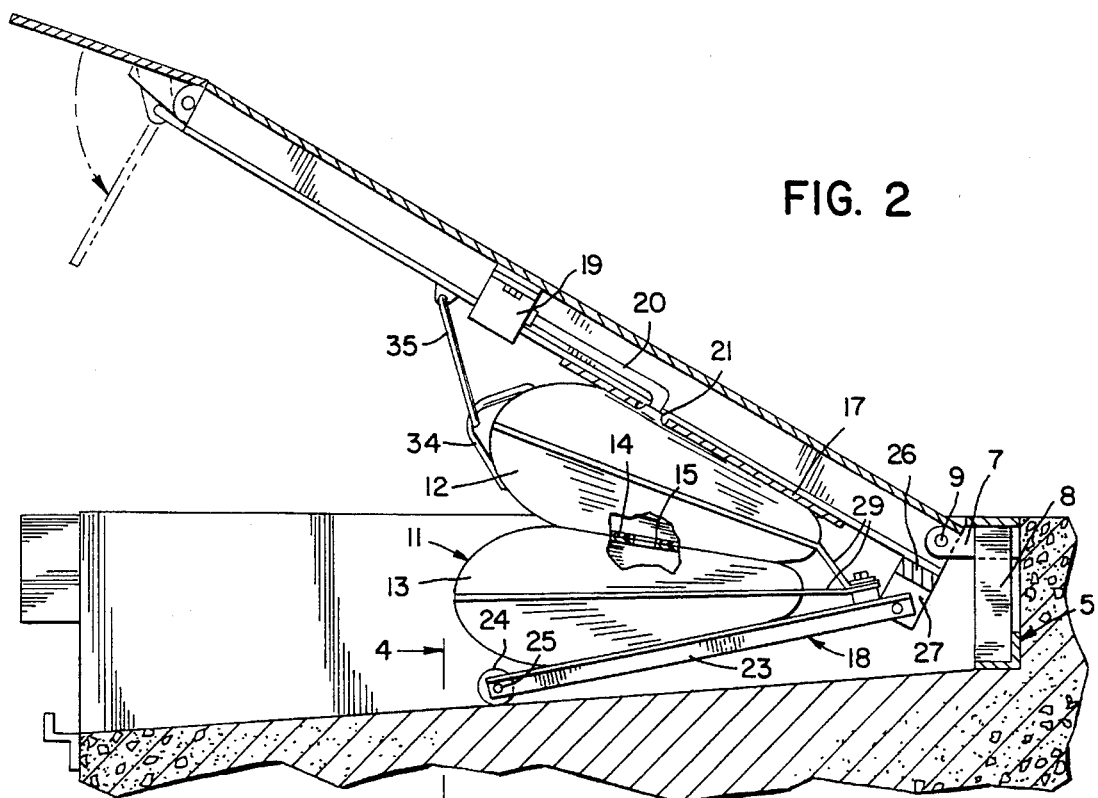
FIG. 2 is a view similar to FIG. 1 showing the ramp in the upwardly inclined position.

FIG. 1 illustrates a dockleveler 1 which is mounted in a pit or depression 2 in a loading dock 3. The lower surface or floor 4 of pit 2 slopes downwardly and forwardly as seen in FIGS. 1 and 2. Dockleveler 1 is adapted to bridge the gap between the upper surface of the loading dock 3 and the bed of a truck or carrier parked in front of the loading dock.

Dock leveler 1 includes a frame or supporting structure 5, which is mounted in the rear of pit 2, and the rear end of a ramp or deck plate 6 is pivoted to the frame 5, so that the ramp is movable between a generally horizontal cross traffic position, where the ramp is flush with the upper surface of dock 3, and an upwardly inclined position, as shown in FIG. 2.

To pivot the ramp 6 to frame 5, a series of lugs 7 are mounted on vertical legs 8 of frame 5 and are pivoted through a hinge pin 9 to the rear end of ramp 6.

Hinged to the forward end of ramp 6 is an extension lip 10 which is adapted to be pivoted from a downwardly hanging pendant position, as shown in FIG. 1 to an outwardly extending position, as shown in FIG. 2, where the lip forms an extension to ramp 6. Lip 10 can be moved from the pendant to the extension position and held in that position by various mechanical hydraulic or pneumatic mechanisms, and the lip lifting and latching mechanism is not, in itself, a part of the present invention.

When the ramp is in the horizontal position, as shown in FIG. 1, and the lip 10 is pendant, the lower end of the lip is retained within keepers 10a, which are mounted on the front face of dock 3. Engagement of lip 10 with keepers 10a maintains the ramp in the horizontal position.

An inflatable bag assembly 11 is located in pit 2 beneath the ramp 6, and by inflating the bag assembly ramp 6 can be pivoted from the horizontal to the upwardly inclined position. Bag assembly 11 is composed of a pair of vertically superimposed bags 12 and 13. While the drawings show a pair of bags 12 and 13, it is contemplated that any number of stacked bags can be utilized in the bag assembly.

The construction of the bag assembly 11 can be similar to that described in pending U.S. patent application Ser. No. 08/131,981, filed Oct. 4, 1993.

Bags 12 and 13 are preferably formed of fabric, such as nylon or polyester, impregnated with a thermoplastic resin and have contiguous horizontal surfaces which are joined together along an annular sealed area 14 that borders an unsealed central area. One or more holes 15 extend through the central area to provide communication between the interiors of the bags 12 and 13.

The upper surface of bag assembly 11 bears against an upper plate 17 which is mounted to the underside of ramp 6, while the lower surface of the bag assembly is supported on a bag support member or frame 18.

To inflate bag assembly 11, a low pressure fan 19, similar to that described in pending U.S. patent application Ser. No. 07/814,002 filed Dec. 26, 1991, is mounted to the undersurface of ramp 5 between the parallel beams of the ramp. The outlet of fan 19 is connected through an air line 20 to a fitting 21 in bag 12. With this construction operation of fan 19 will inflate bags 12 and 13. When operation of fan 19 is terminated, the weight of the ramp 6 will deflate the bags 12 and 13, exhausting the air through the fan 19.

Figure 4:
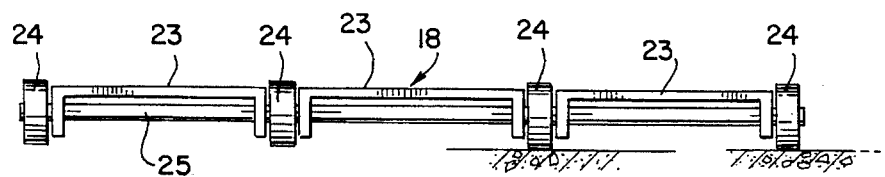
FIG. 4 is a section taken along line 4—4 of FIG. 2.

The bag support member 18, as best shown in FIGS. 4 and 5 is composed of a plurality of parallel, spaced, channel-shaped sections 23. Rollers 24 are located between adjacent sections 23 and similar rollers 24 are located outboard of the outer sections 23. Rollers 24 are journaled on a shaft 25 that extends through the flanges of the channel-shaped sections 23.

As shown in FIGS. 1 and 2, rollers 24, which are located at the forward end of the bag support member 18, are adapted to ride on the sloping floor 4 of pit 2, as the ramp is raised and lowered.

As a feature of the invention, the rear end of the bag support member 18 is pivoted to the rear end of ramp 6. In this regard, a cross bar 26 is mounted to the underside of the ramp and extends transversely of the ramp, and a series of lugs 27 extend downwardly from cross bar 26. A pivot shaft 28 extends through aligned holes in lugs 27, as well as in the flanges of the channel-shaped sections 23, and serves to pivotally connect the bag support member 18 to the ramp.

Figure 3:
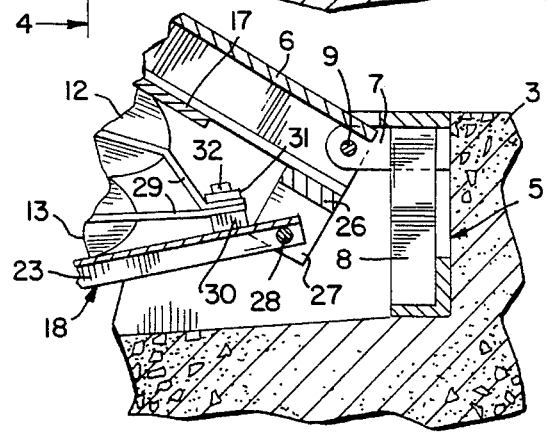
FIG. 3 is an enlarged fragmentary vertical section showing the attachment of the bag support member to the ramp

Each of the bags 12 and 13 is provided with a rearwardly extending strip or tether 29 and the tethers are secured to the rear end of bag support member 18, as best illustrated in FIG. 3. A cross bar 30 extends transversely across the upper surfaces of the sections 23, and the tethers 29 are secured to the cross bar through a clamping bar 31 and bolts 32. The tethers 19 prevent the bags 12 and 13 from squeezing forwardly as the bags are inflated to elevate the ramp 6.

As the bag support member 18 is connected directly to the ramp 6, the bag support member will move forwardly with the ramp as the ramp is pivoted upwardly and the rollers 24 permit the bag support member to ride on the pit floor 4, as the ramp is raised and lowered. As the ramp 6 and bag support member 18 move together, relative movement between the bag assembly 11 and ramp plate 17 and bag support member 18 is minimized.

If bag support member 18 was not tied to ramp 6 and instead was connected to frame 5, the ramp would tend to move forwardly to a greater extent than the bag support member as the bag was inflated and the ramp was elevated. Initially, friction would tend to hold the bag in engagement with the ramp plate and the bag supporting plate, but as the bag was further inflated, the frictional forces are overcome causing the bag to snap forwardly. This action would put a strain on the tethers. Further, the relative movement between the upper and lower surfaces of the bag against the ramp plate and the bag support member could cause undue wear on the bag surfaces.

As a feature of the invention, the upper surface face of bag 12 is connected to the plate 17, preferably by a removable connection. As shown in the drawings, the releasable connection can take the form of a pair of loops 34 secured to the forward end of upper bag 12, and the loops are each connected through a strap or cord 35 to the underside of ramp 6. Engagement of straps 35 and loops 34 will prevent the bag assembly 11 from collapsing downwardly against the bag supporting member 18 when operation of fan 19 is discontinued and will maintain the bag volume. For example, when the ramp 6 descends from the upwardly inclined position shown in FIG. 2, due to discontinuation of operation of fan 19, the extended lip 10 will engage the truck bed, but the bag assembly 11 will maintain its volume and will not collapse against the bag support member 18, due to the connections 34,35. If the truck bed is above the level of dock 3 and the truck subsequently pulls away from the dock, the ramp will further descend, compressing the air within the bag assembly 11, and exhausting the air through the restriction of fan 19. Thus, the ramp will descend slowly, enabling the lip 10 to fall to its pendant position where it can engage the keepers 10a on the dock face.

The connection between the bag assembly 11 and the ramp plate 17 is also important in situations where the ramp may be at a downwardly inclined position during the loading operation. When the truck subsequently pulls away from the dock with the ramp 6 in this downwardly inclined position, the lip 10 will not be in position to engage the keepers 10a, with the result that the ramp will descend and bottom out in the pit 2. With the connection between the plate 17 and the bag assembly 11, which retains the bag volume, the descent of the ramp will be slowed, so it will not slam into the pit floor.

While the drawings show the releasable connection to be straps 35 and loops 34, it is contemplated that various types of connections can be employed to connect the upper end of bag assembly 11 to the ramp plate 17 or the ramp 6, to thereby prevent the deflated bag assembly from collapsing downwardly against the bag support member 18.

Various modes of carrying out the invention are contemplated as being within the scope of the following claims particularly pointing out and distinctly claiming the subject matter which is regarded as the invention.

I claim:

1. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, and connecting means for connecting said bag support means to said ramp, said connecting means being constructed and arranged so that the bag support means will move across the floor of the pit in accordance with pivotal movement of the ramp.

2. The combination of claim 1, wherein said connecting means pivotally connects a rear end of said bag support means to a rear end of said ramp.

3. The combination of claim 1, and including guide means disposed on a forward end of said bag support means and disposed to ride on the floor of said pit as said ramp is pivoted between the horizontal and the upwardly inclined positions.

4. The combination of claim 1, wherein said bag assembly comprises a plurality of vertically superimposed interconnected bags.

5. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, connecting means for connecting a rear end of said bag support means to a rear end portion of said ramp, said connecting means comprising lug means extending downwardly from a rear end of said ramp, and a pivot shaft connecting said lug means to the rear end of said bag support means, and guide means disposed on a forward end of said bag support and disposed to ride on the floor of the pit as the ramp is pivoted between the horizontal position and the upwardly inclined position.

6. The combination of claim 5, and including means for attaching the bag assembly to an undersurface of the ramp to prevent the deflated bag assembly from collapsing against said bag support means.

7. The combination of claim 5, wherein said bag assembly includes a plurality of superimposed bags, a tether extending rearwardly from each bag, and attaching means for attaching the tethers to said bag support means.

8. The combination of claim 5, and including means for preventing free collapse of said bag assembly against said bag support means on discontinuation of operation of said inflating means.

9. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, and connecting means for connecting said bag support means to said ramp so that the bag support means will move in the pit in accordance with pivotal movement of the ramp, said connecting means pivotally connecting a rear end of the bag support means to a rear end of said ramp.

10. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, connecting means for connecting said bag support means to said ramp so that the bag support means will move in the pit in accordance with pivotal movement of the ramp, guide means disposed on a forward end of said bag support means and disposed to ride on the floor of said pit as the ramp is pivoted between the horizontal and upwardly inclined positions, said guide means comprising a plurality of rollers.

11. The combination of claim 10, wherein said floor slopes downwardly and forwardly.

12. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, connecting means for connecting a rear end portion of said bag support means to a rear end portion of said ramp, said connecting means comprising lug means extending downwardly from said rear end portion of said ramp, and a pivot shaft connecting said lug means to the rear end portion of said bag support means, and guide means disposed on a forward end of said bag support means and disposed to ride against the floor of the pit as the ramp is pivoted between the horizontal position and the upwardly inclined position, said pit sloping downwardly and forwardly and said guide means comprising a plurality of rollers disposed to ride on said floor.

13. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, connecting means for connecting a rear end portion of said bag support means to a rear end portion of said ramp, and guide means disposed on a forward end of said bag support means and disposed to ride on the floor of the pit as the ramp is pivoted between the horizontal position and the upwardly inclined position, said bag support means comprising a plurality of parallel sections extending in a front to rear direction, said guide means comprising a plurality of rollers disposed between adjacent sections, and journaling means for journaling the rollers for rotation relative to said sections.

14. The combination of claim 13, wherein each section is generally channel-shaped in cross section.

15. In combination, a loading dock having an upper dock surface and having a pit disposed in said upper surface, said pit having a floor, a supporting structure disposed in said pit, a ramp having a rear edge hinged to the supporting structure at a hinge connection and pivotally movable between a generally horizontal position and an upwardly inclined position, bag support means disposed in the pit beneath the ramp, an inflatable bag assembly disposed between the ramp and said bag support means, inflating means for inflating the bag assembly to thereby pivot the ramp from the horizontal to the upwardly inclined position, pivotal connecting means for connecting a rear end portion of said bag support means to a rear end portion of said ramp, said pivotal connecting means being spaced from said hinge connection, and guide means disposed on the forward end of said bag support means and disposed to ride against the floor of the pit as the ramp is pivoted between the horizontal position and the upwardly inclined position.

16. The combination of claim 15, wherein said connecting means includes a plurality of lugs extending downwardly from the rear end of said ramp, said lugs being disposed between adjacent sections of said bag support means, and means for pivotally connecting said lugs to said sections.

17. The combination of claim 15, wherein said guide means comprises at least one roller disposed to ride on said floor.

18. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, a generally flat pressure member attached to an under surface of said ramp, an inflatable bag assembly disposed between said bag support means and said pressure member, said bag assembly being free of attachment to said pressure member, inflating means for inflating the bag assembly to thereby pivot the ramp from the horizontal to the upwardly inclined position, connecting means for connecting a rear end portion of said bag support means to a rear end portion of said ramp, and means for preventing free collapse of said bag assembly against said bag support means on discontinuation of operation of said inflating means.

19. The combination of claim 18 wherein said means for preventing free collapse of said bag assembly comprises a flexible member interconnecting an upper portion of said bag assembly and said ramp.

20. In combination, a loading dock having an upper dock surface and having a pit disposed in said upper surface, said pit having a floor, a supporting structure disposed in said pit, a ramp having a rear edge hinged to the supporting structure and pivotally movable between a generally horizontal position and an upwardly inclined position, bag support means spaced beneath the ramp, an inflatable bag assembly disposed between the ramp and said bag support means, inflating means for inflating the bag assembly to thereby pivot the ramp from the horizontal to the upwardly inclined position, and means operable as a consequence of movement of said ramp from said horizontal position to said inclined position for moving a forward end of said bag support means in a rear to forward direction across the floor of said pit.

* * * * *